(12) United States Patent
Dolgos

(10) Patent No.: US 11,274,768 B2
(45) Date of Patent: Mar. 15, 2022

(54) SERVICEABLE TEMPERATURE PROTECTION SYSTEM FOR FAUCET AND METHOD OF USING SAME

(71) Applicant: Focus Marketing LLC, Allison Park, PA (US)

(72) Inventor: Scott E. Dolgos, Bridgeville, PA (US)

(*) Notice: Subject to any disclaimer, the term of this patent is extended or adjusted under 35 U.S.C. 154(b) by 157 days.

(21) Appl. No.: 16/687,397

(22) Filed: Nov. 18, 2019

(65) Prior Publication Data

US 2020/0158257 A1    May 21, 2020

Related U.S. Application Data

(60) Provisional application No. 62/768,651, filed on Nov. 16, 2018.

(51) Int. Cl.
*F16K 43/00* (2006.01)
*G05D 23/13* (2006.01)

(52) U.S. Cl.
CPC ....... *F16K 43/003* (2013.01); *G05D 23/1306* (2013.01)

(58) Field of Classification Search
CPC .......................... F16K 43/003; G05D 23/1306
See application file for complete search history.

(56) References Cited

U.S. PATENT DOCUMENTS 9,909,672 B2 * 3/2018 Henwood ............. F16K 5/0657

\* cited by examiner

*Primary Examiner* — Eric Keasel
(74) *Attorney, Agent, or Firm* — Maginot, Moore & Beck LLP

(57) ABSTRACT

A temperature protection system includes a thermostatic mixing valve (TMV) and a stop valve assembly. The TMV is operably coupled to provide temperature controlled water to a faucet. The stop valve assembly is coupled between the TMV and a source of water. The stop valve assembly has a stop valve body, a stop valve element, and a ball valve. The stop valve body has a stop valve receiving tube, a water inlet tube and an outlet tube. The water inlet tube defines a water inlet to the stop valve body, and the outlet tube forms a water outlet to the stop valve body. The stop valve element is disposed within the stop valve receiving tube and interposed at least in part between the outlet tube and the water inlet. The ball valve disposed in the inlet tube between the stop valve element and the water inlet.

11 Claims, 8 Drawing Sheets

SERVICEABLE TEMPERATURE PROTECTION SYSTEM FOR FAUCET AND METHOD OF USING SAME

This application claims the benefit of U.S. Provisional Patent Application Ser. No. 62/768,651, filed Nov. 16, 2018, which is incorporated herein by reference.

BACKGROUND

Temperature protection systems for faucets are systems that control the outlet temperature of a faucet or plumbing fixture. For example, certain plumbing codes require the use of a thermostatic mixing valve in such a temperature protection system. These mixing valves are generally located below each individual faucet in public area applications. The purpose of the thermostatic mixing valve (hereinafter, "TMV") is to ensure that the water temperature does not exceed a pre-set "safe" temperature.

While these TMVs safely mix incoming hot and cold water, they are situated in a position within the plumbing system that creates a potential cross connection that can affect a potable water system. Although the TMVs that are required by code employ designs to reduce this potential cross connection by the use of internal one way check valves, they have substantial short comings. The TMV check valves are typically located within the TMV valve body and inaccessible, and tend to be very unreliable.

To address the failure potential of the TMV check valve, it is known to use an additional check valve or stop valve between the water source line and the TMV. The stop valve is preferably located below the faucet so that it may be easily accessed. In some embodiments, the stop valve has a manual adjustment for water flow control. The manual adjustment may be used for both shut-off, in the event that work must be done on the faucet (or TMV), or to modulate the amount of water available to the faucet. In general, however, the stop valve operates as a more robust check against backflow should the TMV check valve fail.

However, it has been determined that the stop valve can at times also develop issues that require maintenance, such as debris in the valve that prevents it from closing entirely. As such, it can be difficult to determine if either the TMV check valve or the stop valve requires replacement or repair. In either case, it may become necessary to turn off water to the entire facility, or at least a significant portion of the facility. Moreover, in some cases, if the TMV check valve is to be serviced, the stop valve can be manually closed to turn off the water flow. In such a case, however, if the stop valve had been set for a predetermined flow rate, then it can be difficult to return the stop valve to the desired flow rate. There is a need, therefore, for a temperature protection system that is more easily serviceable and robust.

SUMMARY

At least one embodiment of the present invention addresses the above-discussed need, as well as others by providing a serviceable temperature protection system for a faucet that employs a stop valve body having an additional, externally adjustable ball valve disposed between the stop valve element and the water source. Other embodiments involve using a first valve upstream of a stop or check valve to enable servicing of the faucet system in ways that limit the interruption to water service in a facility in which the faucet is located.

A first embodiment is a temperature protection system that includes a thermostatic mixing valve (TMV) and a stop valve assembly. The TMV is operably coupled to provide temperature controlled water to a faucet. The stop valve assembly is coupled between the TMV and a source of water. The stop valve assembly has a stop valve body, a stop valve element, and a ball valve. The stop valve body has a stop valve receiving tube, a water inlet tube and an outlet tube. The water inlet tube defines a water inlet to the stop valve body, and the outlet tube forms a water outlet to the stop valve body. The stop valve element is disposed within the stop valve receiving tube and interposed at least in part between the outlet tube and the water inlet. The ball valve disposed in the inlet tube between the stop valve element and the water inlet.

In some embodiments, the ball valve is rotatable about an axis between an open position and a closed position. The open position allows fluid flow between the water inlet tube and the stop valve element, and the closed position substantially prevents fluid flow between the water inlet tube and the stop valve element.

In embodiments, a rotatably insertable bushing is coupled to the stop valve body within the water inlet tube and forms at least part of a valve seat for the stop valve.

Another embodiment is a method for servicing a temperature protection system. The method includes manually adjusting a first valve having an open position and a closed position to a closed position. The first valve forms a part of a stop valve assembly coupled to allow fluid flow from a source of water to a thermostatic mixing valve (TMV). The TMV is operably coupled to provide temperature regulated water to a faucet. The stop valve assembly further includes a stop valve body and a stop valve element, the stop valve body integrally formed to have a stop valve receiving tube, a water inlet tube and an outlet tube. The water inlet tube defines a water inlet to the stop valve body, and the outlet tube forming a water outlet from the stop valve body. The stop valve element is disposed within the stop valve receiving tube and interposed at least in part between the outlet tube and the water inlet. The first valve is disposed in the inlet tube between the stop valve element and the water inlet and is configured to provide fluid communication between the water inlet and the stop valve element in the open position, and to inhibit fluid communication between the water inlet and the stop valve element in the closed position. The method also includes removing both of the stop valve element and the thermostatic mixing valve when the first valve is in the closed position.

Yet another embodiment is a method of performing service on a faucet system. The method includes adjusting a stop valve element of a stop valve assembly to a first valve position of a plurality of partially open valve positions between a fully open position and a fully closed position. The stop valve element forms a part of a stop valve assembly coupled to allow fluid flow from a source of water to a thermostatic mixing valve (TMV) of the faucet system. The TMV is operably coupled to provide temperature regulated water to a faucet. The stop valve assembly further includes a stop valve body and a first valve, the stop valve body integrally formed to have a stop valve receiving tube, a water inlet tube and an outlet tube. The water inlet tube defines a water inlet of the stop valve body, and the outlet tube forms a water outlet of the stop valve body. The stop valve element is disposed within the stop valve receiving tube and interposed at least in part between the outlet tube and the water inlet. The first valve is disposed in the inlet tube between the stop valve element and the water inlet and is configured to provide fluid communication between the water inlet and the stop valve element in the open position, and to inhibit fluid communication between the water inlet and the stop valve element in the closed position. The method also includes adjusting the first valve to the closed position, and removing the TMV from the faucet system without moving the stop valve element from the first valve position. The method further includes replacing the TMV in the faucet system or installing a replacement TMV in the faucet system.

The above-described features and advantages, as well as others, will become more readily apparent to those of ordinary skill in the art by reference to the following detailed description and the accompanying drawings.

DETAILED DESCRIPTION

Figure 1:
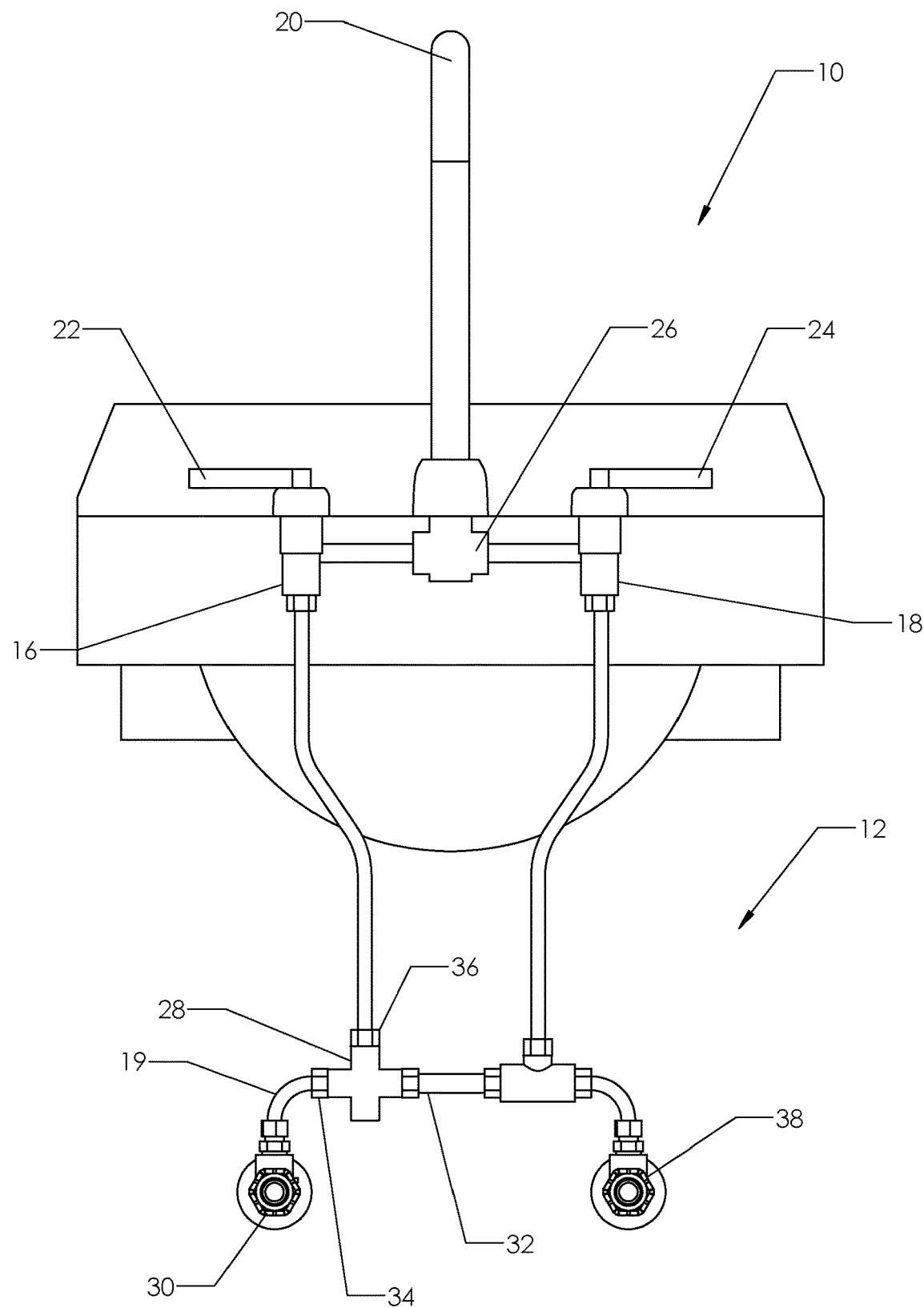
FIG. 1 shows a front plan view of a faucet system that includes a temperature protection system in accordance with a first embodiment of the invention.

FIG. 1 shows a faucet system 10 that includes a faucet 14 and a temperature protection system 12 according to at least one embodiment of the invention. The faucet 14 may suitably be a commercial faucet, for example, a faucet implemented in a health care facility. The faucet system 10 is typically located in the same room of the facility. The fixtures of the faucet 14 include a hot water (HW) faucet valve 16, a cold water (CW) faucet valve 18, a spout 20, a hot water handle 22, a cold water handle 24 and a mixing chamber 26. The temperature protection system 12 includes a thermostatic mixing valve (TMV) 28, and two stop valve assemblies 30, 38.

The CW faucet valve 18 is operably connected to receive cold water from a source of cold water through the stop valve assembly 38, and to provide cold water to the spout 20 via the mixing chamber 26. The CW faucet valve 18 regulates the flow of water to the spout 20 based on the position of the cold water handle 24. To this end, the CW faucet valve 18 and CW handle 24 may be any suitable commercially available faucet devices designed for such purposes.

The HW faucet valve 16 is operably connected to receive regulated hot water from the TMV 28 and to provide regulated hot water to the spout 20 via the mixing chamber. The HW faucet valve 16 regulates the flow of regulated water to the spout 20 based on the position of the hot water handle 22. To this end, the HW faucet valve 26 and HW handle 22 may be any suitable commercially available faucet devices designed for such purposes. It will further be appreciated that the faucet valves 16, 18 and handles 22, 24 may be replaced by corresponding devices of a single handle faucet.

Referring to the temperature protection system 12, the TMV 28 is a device that receives hot and cold water, and provides at an output regulated hot water. As discussed above, it is known to place a TMV 28 in the hot water path to prevent potential scalding to a user from hot water at the spout 20. The TMV 28 may suitably be any commercially available (or other) TMV that, by design, mixes water to provide a safe outlet temperature. The TMV 28 in this embodiment includes a cold water inlet 32, a hot water inlet 34 and a regulated HW output 36. The cold water inlet 32 is operably coupled to a cold water source via the stop valve assembly 38. Similarly, the hot water inlet 34 is operably coupled to a hot water source via a conduit 19 and the stop valve assembly 30. The regulated HW outlet 36 is operably coupled to provide the regulated hot water to the HW faucet valve 16.

Figure 2:
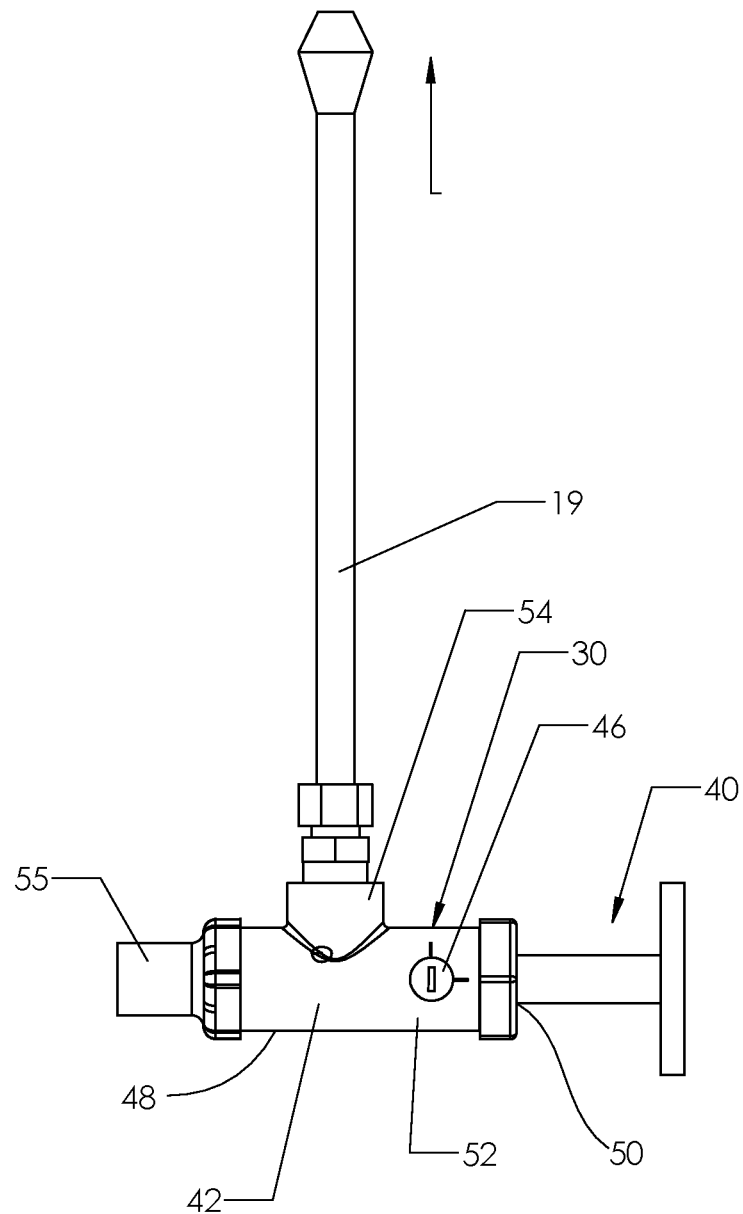
FIG. 2 shows a side plan view of a portion of the commercial fixture of FIG. 1 including a stop valve assembly that incorporates elements of the first embodiment of the invention.
Figure 3:
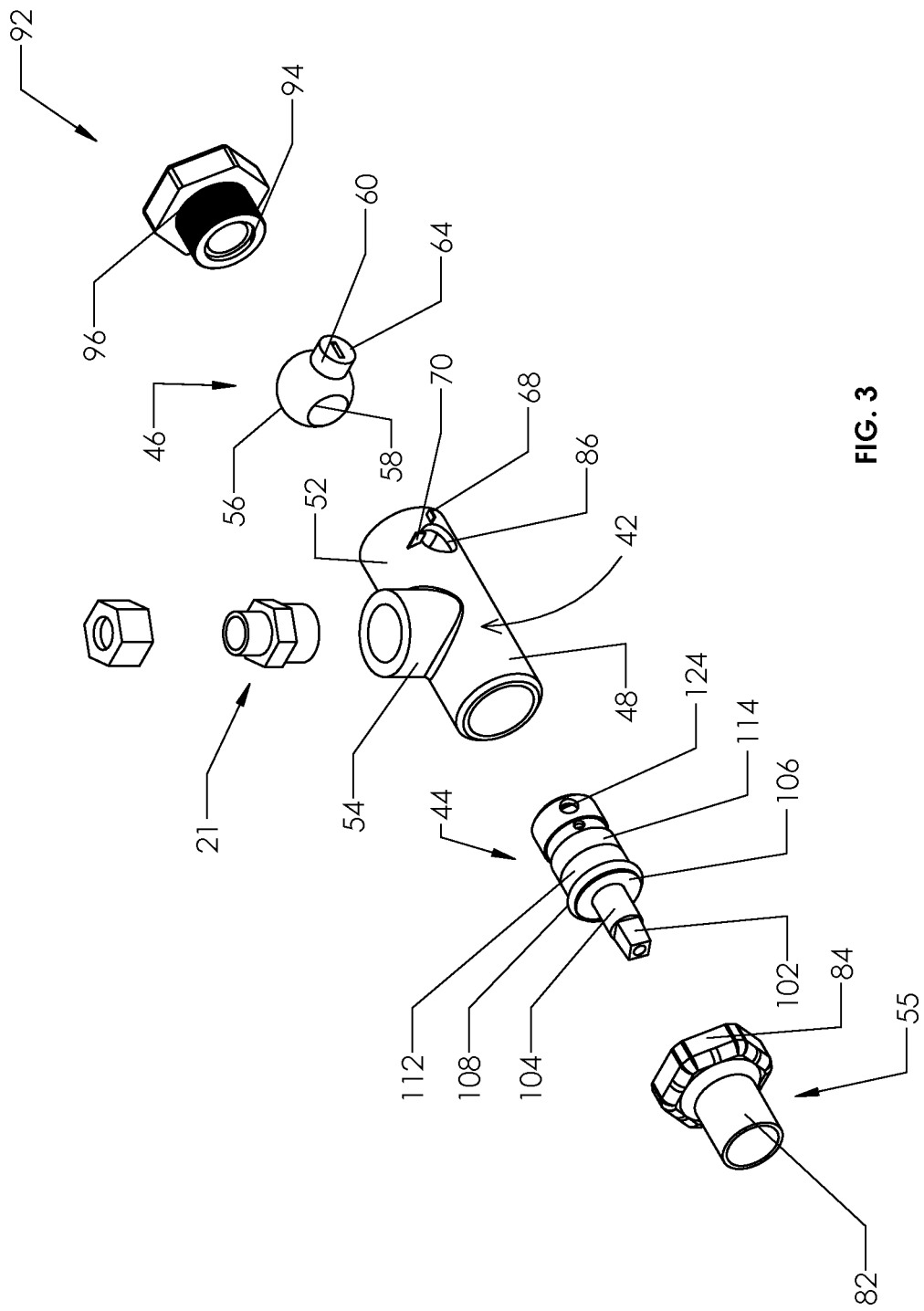
FIG. 3 shows an exploded perspective view of the stop valve assembly of FIG. 2.
Figure 4:
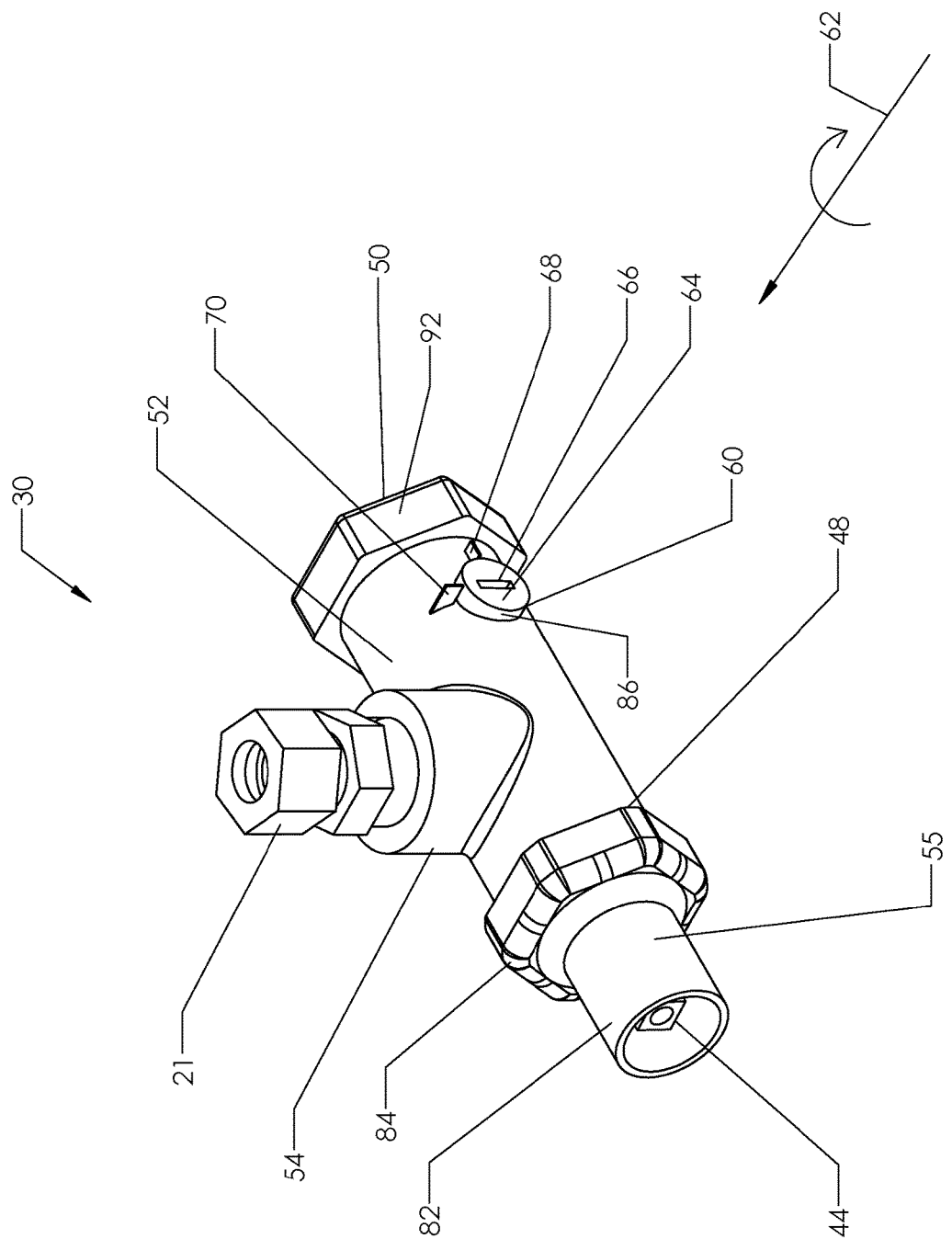
FIG. 4 shows a perspective view of the stop valve assembly of FIG. 2.

FIGS. 2, 3 and 4 show further detail regarding the stop valve assembly 30. FIG. 2 shows a side plan view of the stop valve assembly 30 in context disposed between a source 40 of hot water and the conduit 19. FIG. 3 shows an exploded perspective view of the stop valve assembly 30, and FIG. 4 show a perspective view of the stop valve assembly 30. It will be appreciated that the stop valve assembly 38 of FIG. 1 has an identical structure.

With reference to FIGS. 2, 3 and 4, the stop valve assembly 30 includes stop valve element 44 in the form of a check cartridge, as will be discussed below, which helps avoid possible crossover issues that can be associated with a worn or degraded TMV 28. The stop valve assembly 30 also includes a stop valve body 42 and another valve, which in this embodiment is a ball valve 46. The stop valve body 42 supports and forms the fluid connections between the valve element 44 and the ball valve 46. The stop valve assembly 30 further includes a cap 55 and a rotatably insertable bushing 92.

The stop valve body 42 is preferably an integrally formed plumbing grade structure (e.g. copper) that includes a stop valve receiving tube 48, a water inlet 50, an inlet tube 52, and an outlet tube 54. The stop valve receiving tube 48 is configured to removably receive the stop valve element 44, which as will be discussed below, may be in the form of a rotatably insertable cartridge. The stop valve receiving tube 48 and the inlet tube 52 define a linear passage through the stop valve body 42. The outlet tube 54 extends in a direction perpendicular to the linear passage. The inlet tube 52 is operably coupled to receive hot water from the source 40, and the outlet tube 54 is coupled to provide output water to the TMV 28 (see also FIG. 1) via the conduit 19.

Further detail regarding the stop valve assembly 30 is shown in FIGS. 3 and 4. In particular, the stop valve element 44 is disposed within the stop valve receiving tube 48, and the ball valve 46 is seated in a valve seat within the inlet tube 52. The valve seat of the ball valve 46 is formed in part by a chamfered polymer ring 94 mounted in the brass housing 96 of the bushing 92. As will be discussed below in further detail, the stop valve element 44 has an outlet 124 that is in fluid connection with the outlet tube 54. The ball valve 46 has an open position (shown in FIG. 7) and a closed position (shown in FIG. 8). The ball valve 46 has partially open positions in between, as well. The stop valve element 44 also has a fully open position, a fully closed position, and a plurality of partially open positions in between.

Figure 7:
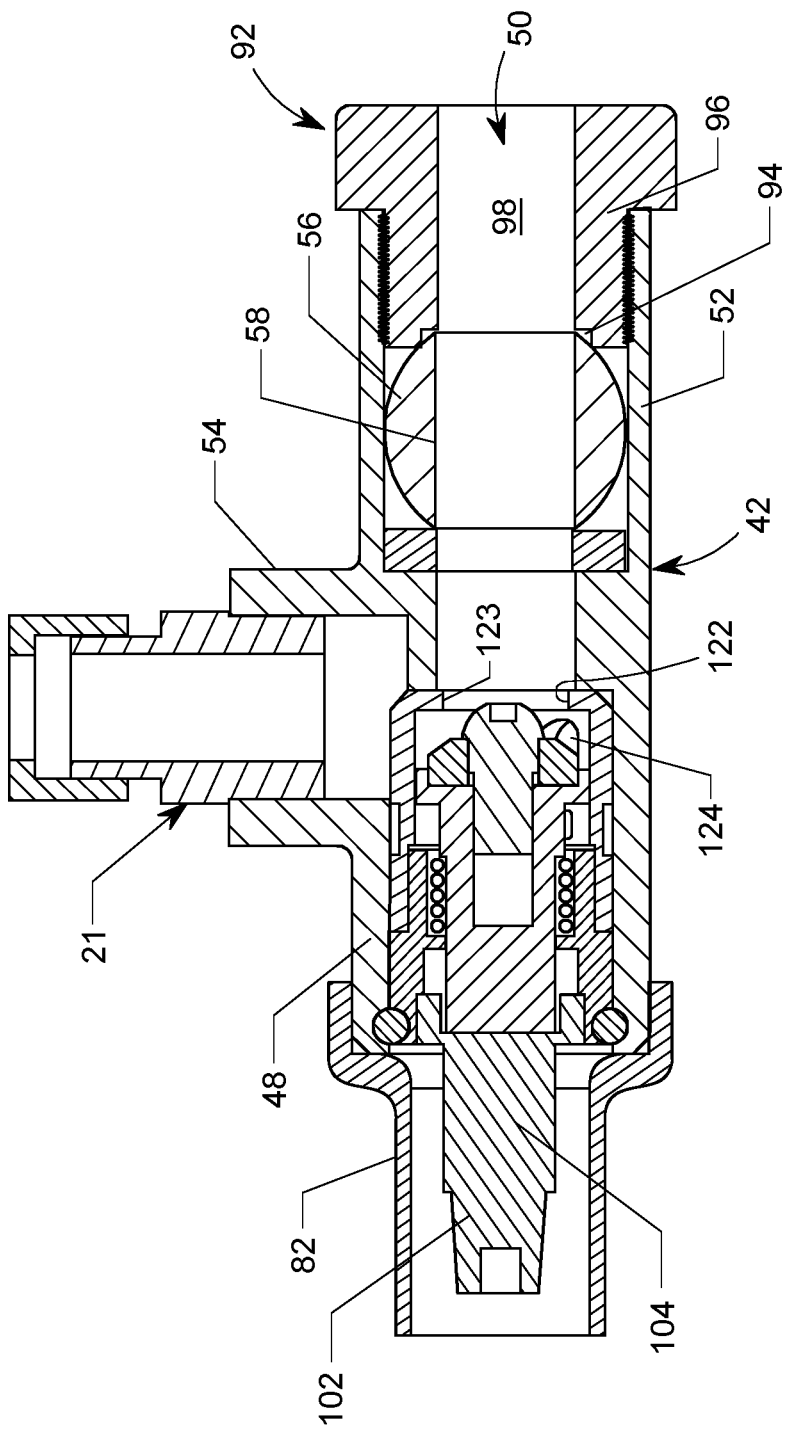
FIG. 7 shows a cutaway view of the stop valve assembly of FIG. 2 in the open position.
Figure 8:
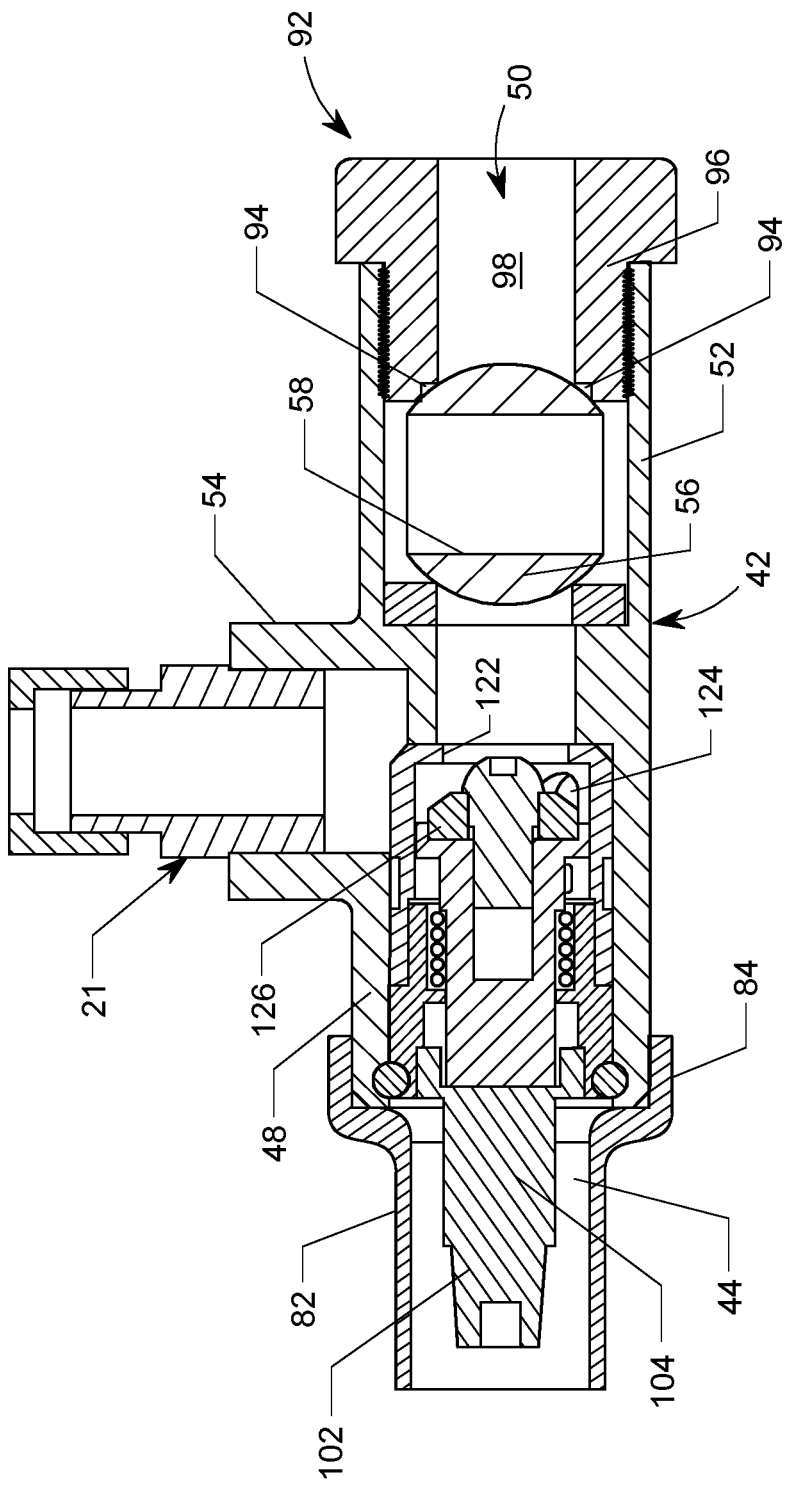
FIG. 8 shows a cutaway view of the stop valve assembly of FIG. 2 in the closed position.

The ball valve 46 includes a ball valve body 56, an interior passage 58, and an actuator stem 60 having an end face 62. The functional aspects of the ball valve 46 are described in additional reference to FIGS. 7 and 8. FIG. 7 shows a cross section of the stop valve assembly 30 when the ball valve 46 is in the open position, and FIG. 8 shows a cross section of the stop valve assembly when the ball valve 46 is in the closed position.

In general, when the ball valve 46 is in the open position (e.g. FIG. 7), or even partially open position), the water inlet 50 of the stop valve body 42 is in fluid communication with the inlet 122 (not shown in FIGS. 3 and 4, but see FIGS. 5, 7 and 8) of the stop valve element 44. To this end, the central passage 58 aligns with the linear passage of the body, and thereby allows water to pass through the ball valve 46. Water passes through the water inlet 50, the interior passage 98 of the bushing 92, and to the inlet 122 of the stop valve element 44.

When the ball valve 46 is in the closed position (e.g. FIG. 8), the water inlet 50 of the stop valve body 42 is not in fluid communication with the inlet 122 of the stop valve element 44. To this end, the central passage 58 is positioned such that it does not allow the entry or exit of water. For example, as shown in FIG. 8, the central passage 58 in this embodiment is aligned perpendicular to linear passage of the stop valve body 42, and such that the ball valve body 56 engages and forms seal with the polymer ring 94 of the bushing 92. In such position, ball valve body 56 completely covers the opening between the interior passage 98 of the bushing 92 and the central passage 58 of the ball valve 46. As a consequence, water from the water inlet 50 cannot pass to the central passage 58 of the ball valve, nor to the stop valve element 44.

Referring again to FIGS. 3 and 4, the actuator stem 60 extends radially outward from the ball valve body 56, and is disposed midway (circumferentially) between the opposing openings of the central passage 58. The actuator stem is rotatable about the axis 62. The actuator stem 60 has an axial height sufficient to extend at least partially, and in the present embodiment fully, through an opening 86 in the stop valve body 42. The actuator stem 60 is configured to rotate the ball valve body 56 between the open position and the closed position. Access to apply torque to the actuator stem 60 pillar is provided by an accessible receptacle or tool interface 66 that is disposed on an exposed end face 64 of the actuator stem 60. The receptacle 66 is configured to receive a drive tool bit, such as that of a screwdriver, an Allen wrench, Torx wrench, or the like.

In this embodiment, the stop valve assembly body 42 includes indicia that cooperate with the actuator stem 60 to provide the user an indicator of the open and closed positions. As shown in FIGS. 3 and 4, the stop valve body 42 further includes a first indicator 68 configured to align with a feature of the receptacle 66 when the ball valve is in the open position, and a second indicator 70 configured to align with the feature of the receptacle 66 when the valve is in the closed position. The feature, for example, may be the linear shape of the receptacle 66 designed to receive a standard, flat-blade screwdriver. The indicators 68, 70 in this embodiment are tabs that extend outward from the stop valve body 42, but could also be markings or indentations in other embodiments. The actuator stem 60 is thus configured such that the linear shape of the receptacle 66 aligns with (points to) the first indicator 68 when the ball valve 46 is in the open position, and aligns with (or points to) the second indicator 70 when the ball valve is in the closed position. It will be appreciated that in other embodiments, the actuator stem 60 may include other features that could "point to" the indicators 68, 70, which may or may not be on the end face 64.

Figure 5:
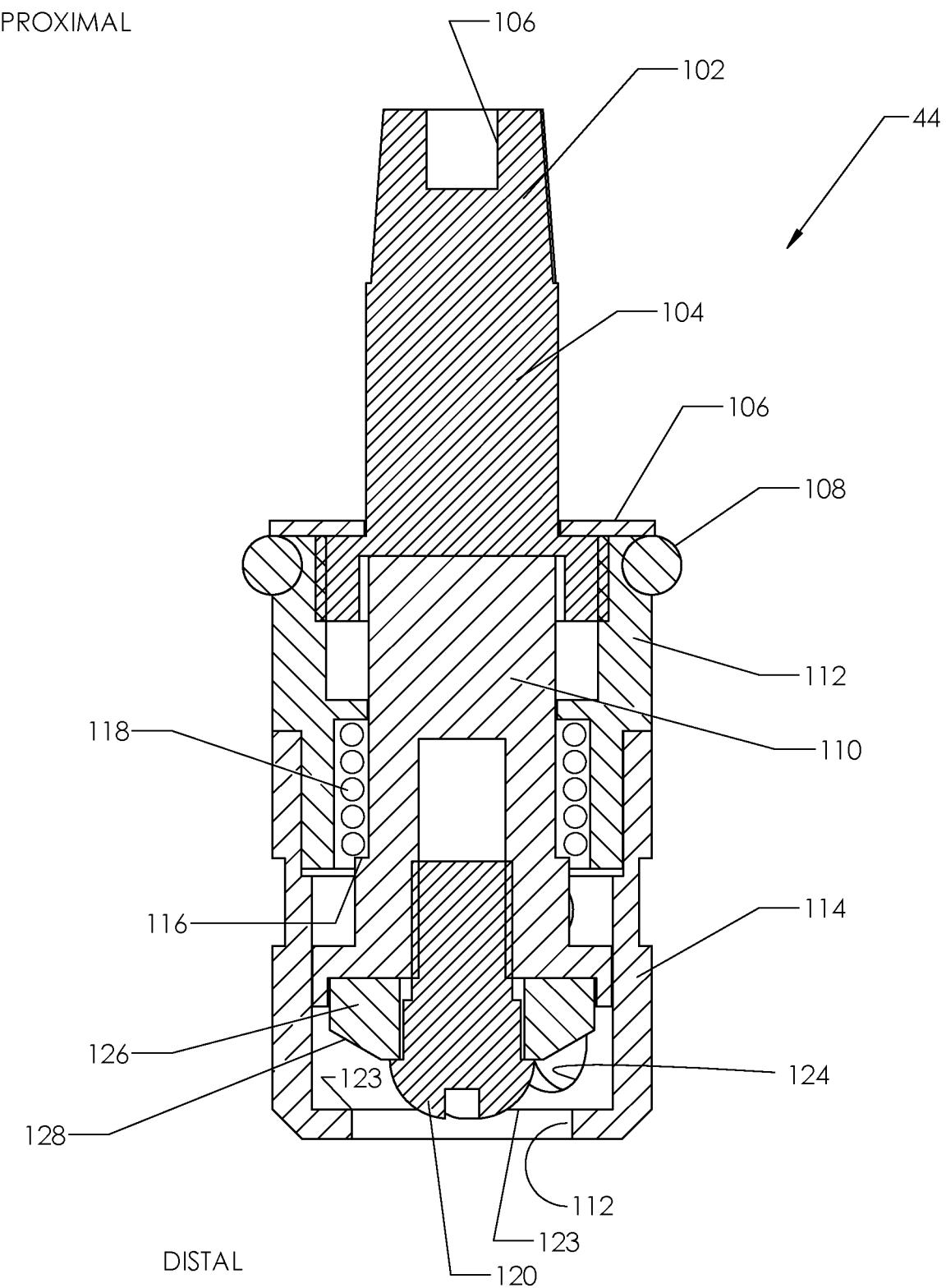
FIG. 5 shows a cutaway view of the stop valve element of the stop valve assembly of FIG. 2.
Figure 6:
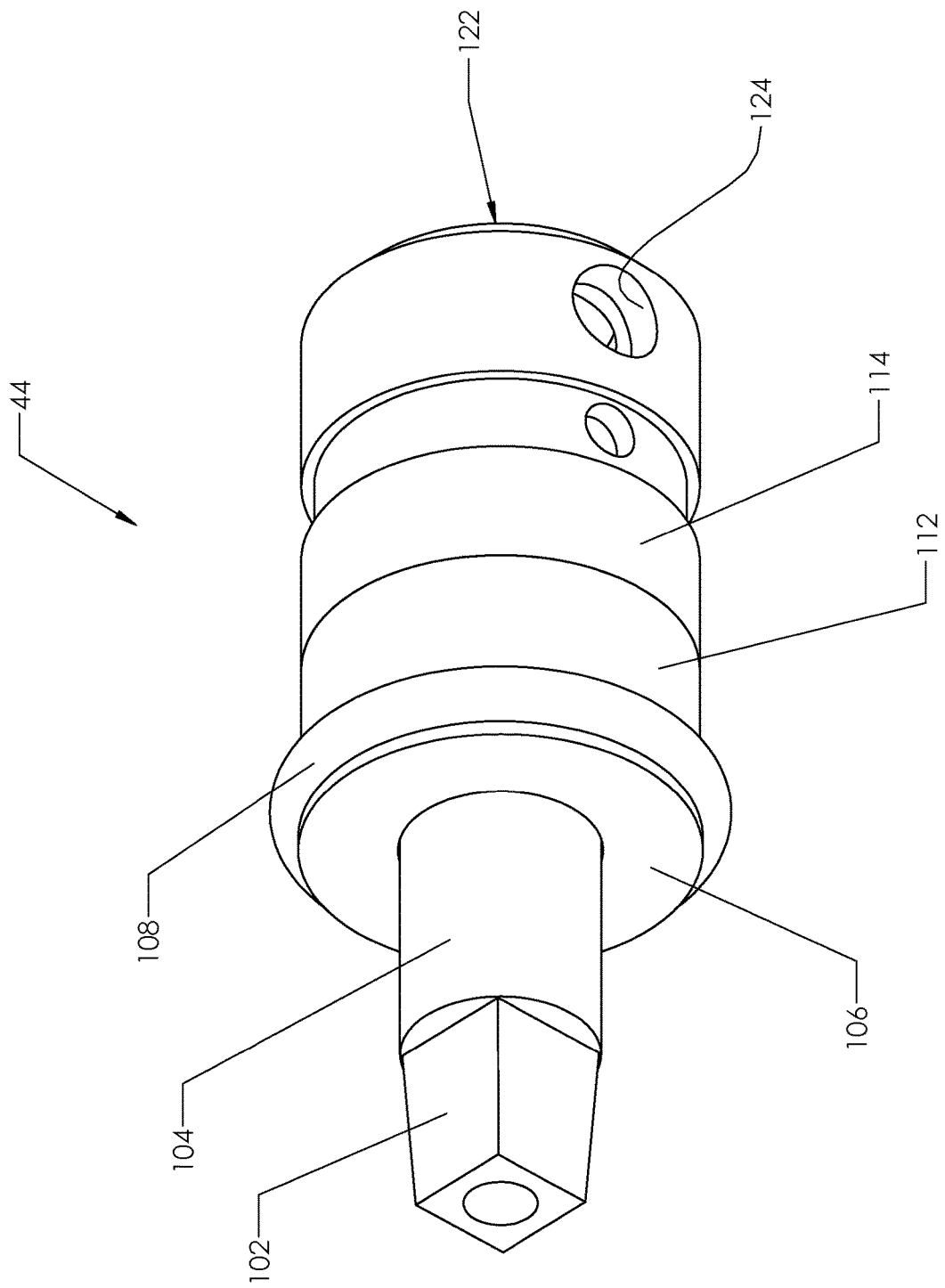
FIG. 6 shows a perspective view of the valve element of FIG. 5.

Referring again to other parts of the stop valve assembly 30, the valve element 44 is shown in further detail in FIGS. 5 and 6. Specifically, FIG. 5 shows a side cutaway view of the stop valve element 44 in the open position. FIG. 6 shows a perspective view of the stop valve element. The stop valve element 44 in this embodiment is a spring loaded, self-closing check valve cartridge having a manual override. The stop valve element 44 is designed to stop the reverse flow of water from the conduit 19 to the hot water source 40. To this end, with additional reference to FIG. 7, the stop valve element 44 includes an inlet 122 that is in fluid communication with the ball valve 46, and one or more outlets 124 that are in fluid communication with the outlet tube 54 of the stop valve body. When the valve element 44 is in the closed position, the inlet 122 is not in fluid communication with the outlet 124. The spring loaded nature of the valve element 44 urges the valve element 44 to the closed position. However, during use of hot water at the faucet 14, the positive water pressure from the source 40 keeps the valve element 44 in the open position.

With reference to FIGS. 5 and 6, the valve element 44 includes a brass or copper housing formed of a proximal housing 112 and a distal housing 114, which are preferably coupled by a suitable threaded engagement to define a shared interior. The distal housing 114 has a first threaded end that engages a correspondingly threaded end of the proximal housing 112, and has a second end that includes an opening that forms the inlet 122. The distal housing 114 includes an outer cylindrical wall having a side opening that forms the outlet 124. The proximal housing 112 includes a first threaded end that engages the threaded end of the distal housing, and a second end having an opening therefore.

The valve element 44 further includes an actuator stem 104, an annular cover plate 106, a sealing ring 108, a piston 110, a spring 118, a fastener 120, and a valve seal 126. The valve element 44 operates on the movement of the piston 110. To this end, the piston 110 is a brass bar that extends along the long axis of the valve element 44 within the housing 112, 114. The valve seal 126, which is formed of a resilient sealing polymer or other material, is affixed to the distal end of the piston 110 by the fastener 120. The valve seal 126 includes beveled edge 128 that, in the closed position, seats against the annular edge 123 that defines the inlet 122 of the distal housing 114. When the valve seal 126 is sealed against the edge 123 of the distal housing 114, the valve seal 126 and fastener 120 prevent water from passing into the inlet 122 (and hence through to the outlet 124. The piston 110 further includes an annular shoulder 116. The proximal end of the piston 110 is configured to engage and seat in a corresponding feature in the actuator stem 104. The piston 110, however, may travel independent of the actuator stem 104.

The actuator stem 104 extends out of the interior formed by the housing 112, 114 and includes an interface 102, 106 that allows external adjustment of the valve element 44. Because the actuator stem 104 can receive and engage the piston 110, the actuator stem 104 defines the extent to proximal stroke of the piston 110, and thus the maximally open position of the valve element 44. The actuator stem 104 threadingly engages the proximal housing 112, and thus may be rotated to adjust the axial position of the actuator stem 104, which in turn defines the extent of the proximal stroke of the piston. The actuator stem 104 includes a tapered square broach 102 its proximal end to facilitate turning thereof by a suitable tool.

The sealing ring 108 prevents leakage and is seated on the outer cylindrical surface of the proximal housing 112. The sealing ring 108 is made from a suitable resilient sealing material. The annular cover plate 106 covers the end of the proximal housing 112 and helps retain the sealing ring 108.

The spring 118 extends around the piston 110, and is trapped between an inward annular shoulder of the proximal housing 112 and the shoulder 116 of the piston 110. The spring 118 is under compression and is biased to expand, thereby moving the piston 110 in the distal direction with respect to the housing 112, 114.

In normal operation, the ball valve 46 is in the open position. If an end user manipulates the HW handle 22 to open the HW faucet valve 16, water will flow from the source 40 to the spout 20 through the stop valve assembly 30 and the TMV 28. In particular, with reference to FIGS. 2, 5, 7 and 8, the water from the source 40 enters the stop valve body 42 at the water inlet 50, and travels through the interior passage 98 of the bushing 92 and the central passage 58 of the ball valve 46. The valve element 44 is situated in the valve element receiving tube 48 of the stop valve body 42, which allows the water to pass further through the stop valve body 42 and enter through the inlet 122. The configuration of the spring 118 is chosen such that with the actuator stem 104 in its proximal position (as shown in FIG. 7), the pressure of the water forces the piston 110 to raise the valve seal 126 off its seat (edge 123 of the distal housing 114). Since the force of the water is greater than the pressure exerted by the spring 118, the valve element 44 allows water flow into the inlet 122 and out of the outlet 124 to the outlet tube 54. As water flows, the valve seal 126 of the piston 110 will remain off of its seating area at the edge 123 of the inlet 122. The hot water flows from the outlet tube 54, through the conduit 19 and to the TMV 28. The TMV 28 may then pass some or all of the hot water (in some cases tempered by cold water) to the mixing chamber 26 via the HW faucet valve 16, where it mixes with cold water from the stop valve 38 if the CW faucet valve 18 is also open. The water in the mixing chamber 26 then proceeds to the spout 20.

If the flow of hot water through the system 10 is stopped at the faucet 14 by manipulation of the HW handle 22, with the ball valve 46 in the open position, the pressure within the system 10 is equalized and the bias tension of the spring 118 forces the piston 110 distally and create its seal between the valve seal 126 and the distal housing 114 at the inlet 122. This action prevents cross-connection between the hot water and cold water systems of the facility, particularly if the stop valve within the TMV 28 fails.

Referring again to FIGS. 3 and 4, the cap 55 includes a shroud that provides modest anti-tamper protection. In particular, the cap 55 includes a hollow cylinder 82 that extends around and limits access to the actuator stem 104. The cap 55 also include a connecting flange 84 that is threaded and can engage corresponding threads on the outer surface of the upper housing 112.

An advantage of having a service stop valve assembly 30 with the additional, externally adjustable and integrated valve 46 is that any plumbing fixture that uses a TMV 28 would have an accessible, maintainable, repairable and testable device that helps protect against cross-connect (between hot water and cold water systems). The stop valve assembly 30 itself offers a redundancy to the features of the TMV 28 that protect against cross-connect, which are not always reliable.

As will be discussed below, the advantage is the accessibility, reparability and the ability to test various elements of the faucet system 10 without opening the plumbing system. In one test, by turning the stop valve element 44 to the fully closed position (by suitable rotation of the actuator stem 104), and then turning the HW faucet valve 16 to the on position (via handle 22), it can be determined if stop valve element 44 has dirt or debris at its seating surface. If water comes out of the spout 20, then there is dirt holding the stop valve element 44 in a non-closed position, and the stop valve element 44 must be removed for repair or replacement.

In accordance with the embodiment described herein, the stop valve element 44 can be removed without shutting down water supply to large portions of the facility, not shown, in which the faucet 14 is disposed. To this end, once it is determined that water continues to run with the stop valve element in the fully closed position, the user manipulates the ball valve 46 (via rotating the actuator stem 60) to the closed position. The stop valve element 44 is then removed, and the ball valve 46 prevents water from flowing. Replacement or cleaning of the stop valve element 44 can thus be easily accomplished by adjusting the ball valve to the closed position, which cuts off water to the stop valve element 44 itself. As discussed above, the stop valve assembly 38 on the cold water side of the system 10 is identical in structure and operation, and may be used the same way.

The present invention will work with stop valves of designs that incorporate the basic structure of the stop valve element 44 discussed herein. While one feature of the embodiment described herein is that the present invention is that the stop valve element 44 is a check cartridge that incorporates resilient 'O' ring seal 108 to make up for the inconsistencies of the low lead brass castings, at least some advantages of the design can be obtained even if prior cartridge designs that incorporate metal to metal seating areas are employed.

Another feature of the embodiments described herein is that it allows for servicing other aspects of the faucet system 10 without necessarily changing the position of the stop valve element 44 to the closed position. In particular, by design and the nature of a service stop, the stop valve element 44 is designed to be left in the open position allowing water to flow through upon request of the faucet 14. This actuator stem 104 is designed to stay in the open position allowing water to flow through the stop valve element 44 at request.

There are times where service is required on the faucet system 10 downstream of the stop valve element 44, such as at the TMV 38 or valves 16 (or 18 in the case of stop vale assembly 38). The stop valve assembly 44 allows for a manual override by turning the stem 104 to exert force downward on this piston 110 (to the fully closed position) to create a water tight seal between the resilient valve seal 126 and edge of the inlet 122. However, the actuator stem 104 may, during normal operation, be adjusted to an axial position (i.e. valve position) that is between a fully open and fully closed position, so as to limit maximum water flow. The partially open valve position corresponds to a desired flow rate. In such a case, it would not be desirable to shut the water off using the stem 104 because it could be difficult or at least inconvenient to return the actuator stem 104 to the same partially open valve position for the desired flow of water. In such a case, the ball valve 46 may be used to turn the water off to allow work on the downstream components without changing the valve position of the stop valve element 44.

In one example involving service to the TMV, the user rotates the actuator stem 60 to close the ball valve 46. The user then removes the TMV 38 for inspection, repair or replacement without changing the valve position of the stop valve assembly 44 via actuator 104. In another example, the user may rotate of the actuator stem 60 to close the ball valve 46, and then remove the HW faucet valve 16 for inspection, repair or replacement without changing the valve position of the stop valve assembly 44 via actuator 104.

It will be appreciated that the above-described embodiments are merely illustrative, and that those of ordinary skill in the art may readily devise their own modifications and implementations that incorporate the principles of the present invention and fall within the spirit and scope thereof.

What is claimed is:

1. A method for servicing a temperature protection system, comprising:
    a) manually adjusting a first valve having an open position and a closed position to a closed position, the first valve forming a part of a stop valve assembly coupled to allow fluid flow from a source of water to a thermostatic mixing valve (TMV), the TMV operably coupled to provide temperature regulated water to a faucet, the stop valve assembly further including a stop valve body and a stop valve element, the stop valve body integrally formed to have a stop valve receiving tube, a water inlet tube and an outlet tube, the water inlet tube defining a water inlet of the stop valve body, and the outlet tube forming a water outlet of the stop valve body, the stop valve element disposed within the stop valve receiving tube and interposed at least in part between the outlet tube and the water inlet, the first valve disposed in the inlet tube between the stop valve element and the water inlet and configured to provide fluid communication between the water inlet and the stop valve element in the open position, and to inhibit fluid communication between the water inlet and the stop valve element in the closed position;
    b) removing both of the stop valve element and the thermostatic mixing valve when the first valve is in the closed position.

2. The method of claim 1, wherein step a) further comprises manually adjusting the first valve to the closed position when the faucet exhibits water flow when the stop valve is closed and a faucet valve coupled the source of water through the stop valve assembly is open.

3. The method of claim 1, wherein the stop valve element is threadingly coupled to the stop valve body, and wherein the step b) further comprises manually rotating the stop valve element.

4. The method of claim 3, wherein the first valve is a ball valve.

5. The method of claim 2, wherein the first valve is a ball valve.

6. A method of performing service on a faucet system, comprising:
    a) adjusting a stop valve element of a stop valve assembly to a first valve position of a plurality of partially open valve positions between a fully open position and a fully closed position, the stop valve element forming a part of a stop valve assembly coupled to allow fluid flow from a source of water to a thermostatic mixing valve (TMV) of the faucet system, the TMV operably coupled to provide temperature regulated water to a faucet, the stop valve assembly further including a stop valve body and a first valve, the stop valve body integrally formed to have a stop valve receiving tube, a water inlet tube and an outlet tube, the water inlet tube defining a water inlet of the stop valve body, and the outlet tube forming a water outlet of the stop valve body, the stop valve element disposed within the stop valve receiving tube and interposed at least in part between the outlet tube and the water inlet, the first valve disposed in the inlet tube between the stop valve element and the water inlet and configured to provide fluid communication between the water inlet and the stop valve element in an open position, and to inhibit fluid communication between the water inlet and the stop valve element in a closed position;
    b) adjusting the first valve to the closed position;
    c) removing the TMV from the faucet system without moving the stop valve element from the first valve position;
    d) replacing the TMV in the faucet system or installing a replacement TMV in the faucet system.

7. The method of claim 6, wherein the first valve is a ball valve.

8. The method of claim 7, wherein the ball valve is rotatable about an axis between the open position and the closed position, and further comprises an actuator stem rotatable about the axis, the actuator stem extending at least partially through an opening in the stop valve body; and
    wherein step b) further comprises rotating the actuator stem to rotate the ball valve from the open position to the closed position.

9. The method of claim 8, wherein the actuator stem includes an end having a tool interface, and wherein step b) further comprises engaging a tool with the tool interface and rotating the tool.

10. The method of claim 5, wherein the ball valve is rotatable about an axis between the open position and the closed position, and further comprises an actuator stem rotatable about the axis, the actuator stem extending at least partially through an opening in the stop valve body; and
    wherein step a) further comprises rotating the actuator stem to rotate the ball valve from the open position to the closed position.

11. The method of claim 10, wherein the actuator stem includes an end having a tool interface, and wherein step a) further comprises engaging a tool with the tool interface and manually rotating the tool.

* * * * *